(12) United States Patent
Miyoshi

(10) Patent No.: US 7,914,721 B2
(45) Date of Patent: Mar. 29, 2011

(54) PROCESS FOR PRODUCING A CERAMIC MATERIAL

(75) Inventor: Tetsu Miyoshi, Ashigarakami-gun (JP)

(73) Assignee: Fujifilm Corporation, Tokyo (JP)

( * ) Notice: Subject to any disclaimer, the term of this patent is extended or adjusted under 35 U.S.C. 154(b) by 162 days.

(21) Appl. No.: 12/261,106

(22) Filed: Oct. 30, 2008

(65) Prior Publication Data

US 2009/0110825 A1    Apr. 30, 2009

(30) Foreign Application Priority Data

Oct. 30, 2007   (JP) ................. 2007-281558

(51) Int. Cl.
B28B 1/32   (2006.01)
(52) U.S. Cl. ......................... 264/121; 264/81
(58) Field of Classification Search ............... 264/121, 264/614, 81, 309, DIG. 72
See application file for complete search history.

(56) References Cited

U.S. PATENT DOCUMENTS

2006/0102613 A1* 5/2006 Kuibira et al. ............ 219/444.1
2006/0108601 A1* 5/2006 Okamoto ...................... 257/177

FOREIGN PATENT DOCUMENTS

JP          06-279127 A   10/1994
JP       2007-162077 A    6/2007

* cited by examiner

*Primary Examiner* — Matthew J Daniels
*Assistant Examiner* — Erin Snelting
(74) *Attorney, Agent, or Firm* — Sughrue Mion, PLLC

(57) ABSTRACT

For producing a ceramic material, a mask having a predetermined shape is located on a substrate, and a spacing is formed between the substrate and the mask. An aerosol, which contains a carrier gas and raw material particles dispersed in the carrier gas, is jetted out onto the substrate, and the jetted-out aerosol is caused to flow into the spacing between the substrate and the mask. The raw material particles, which are contained in the aerosol, are deposited in the spacing between the substrate and the mask, and a molded body having the same shape as the shape of the mask is formed.

6 Claims, 5 Drawing Sheets

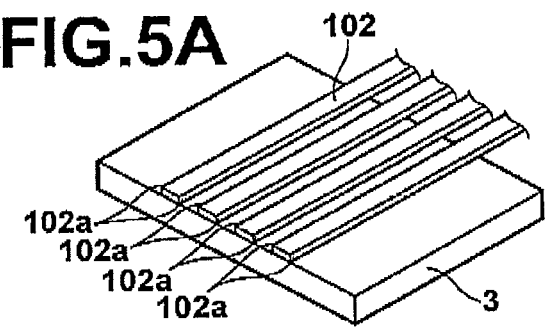
FIG.5A
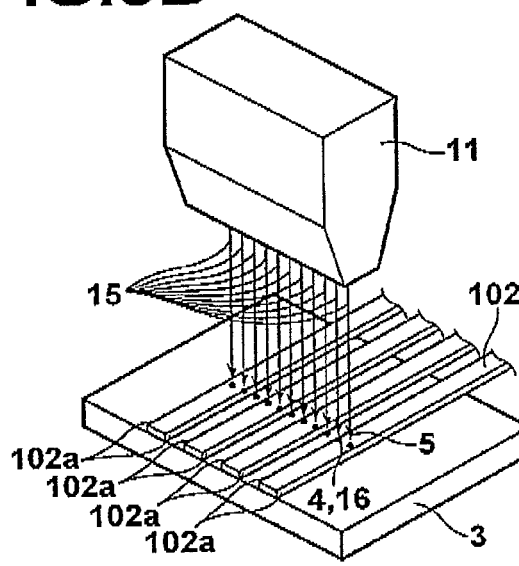
FIG.5B
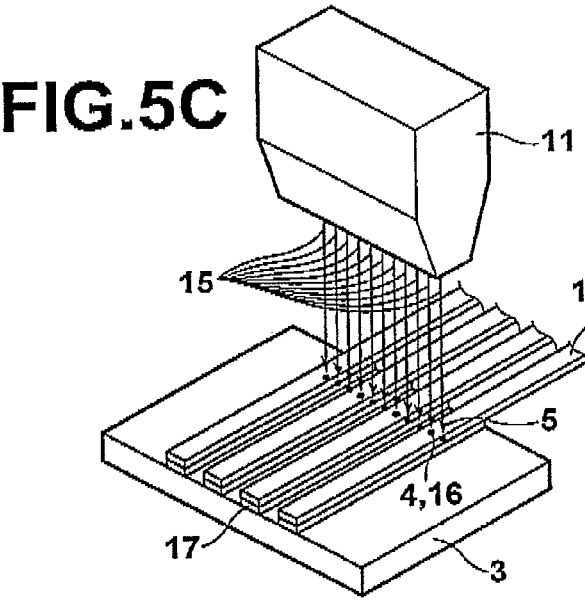
FIG.5C
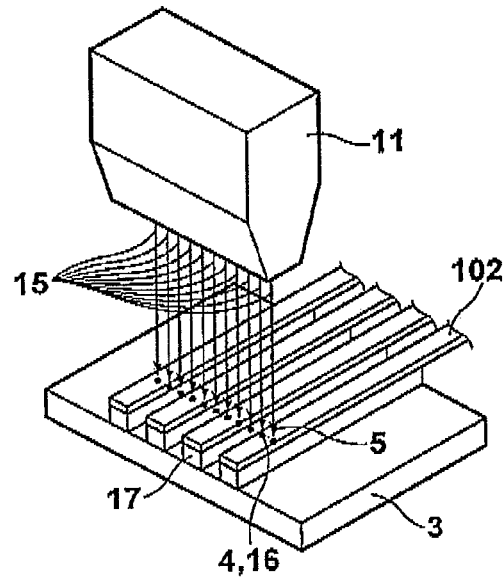
FIG.5D
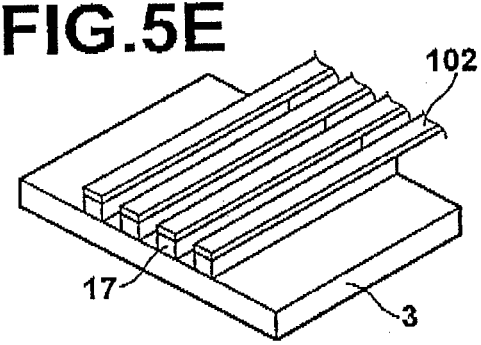
FIG.5E
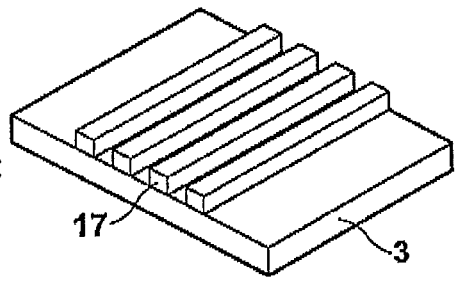
FIG.5F
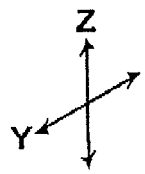

PROCESS FOR PRODUCING A CERAMIC MATERIAL

BACKGROUND OF THE INVENTION

1. Field of the Invention

This invention relates to a process and apparatus for producing a ceramic material. This invention particularly relates to a process and apparatus for producing a ceramic material, wherein aerosolized raw material particles are jetted out and wherein the raw material particles are thereby deposited on a substrate to form a molded body.

2. Description of the Related Art

Heretofore, injection molding techniques have been utilized as the techniques for producing ceramic materials. With the injection molding techniques, though complicated molded bodies are capable of being molded accurately, mixing proportions of organic binders with respect to molding materials are as high as approximately 50% by weight. Therefore, expansion and contraction differences of the molded bodies at the time of degreasing steps are large. In order for cracking due to the expansion and contraction differences to be prevented, it is necessary to perform the degreasing steps for a long period of time while distributions of temperatures of the molded bodies are being kept to be small at markedly low temperature rising rates.

For example, in Japanese Unexamined Patent Publication No. 6(1994)-279127, there has been proposed a degreasing step, wherein heating from inside regions of molded bodies is performed by microwave heating and wherein the distributions of temperatures within the molded bodies are kept to be small. However, in the cases of materials, such as PZT and $BaTiO_3$, which have large dependency of a dielectric loss upon temperatures and which have a low thermal conductivity, there is the risk that nonuniform temperature distributions will arise, and that local heated regions will melt due to a runaway phenomenon in which microwave energy concentrates at local regions.

Also, for example, in Japanese Unexamined Patent Publication No. 2007-162077, an aerosol deposition (AD) technique utilizing shock compaction phenomenon of solid particles has been disclosed as a process for producing a ceramic material. The disclosed AD technique has attracted particular attention. Specifically, with the AD technique, an aerosol containing raw material particles dispersed in a carrier gas is jetted out from a nozzle toward a substrate, the raw material particles are deposited on the substrate, and a molded body is thereby formed. With the AD technique, the raw material particles are bound firmly to one another by the shock compaction phenomenon, and therefore the use of organic binders is suppressed.

However, with the rapid advances made in development of devices related to micro electro-mechanical systems (MEMS) in recent years, there has arisen a strong demand for formation of fine structures and integration of devices, such as laminated ceramic capacitors and piezoelectric actuators. Also, there is a strong demand for suppression of the use of organic binders such that discharging of the organic binders in the degreasing steps as greenhouse gases may be prevented from the view point of environmental loads, and such that the consumption of energy for long-time heating in the degreasing steps may be prevented.

With the technique disclosed in Japanese Unexamined Patent Publication No. 6(1994)-279127, in order for the ceramic material having the complicated shape to be molded as described above, it is necessary for a comparatively large quantity of organic binders to be added for enhancement of fluidity.

With the technique disclosed in Japanese Unexamined Patent Publication No. 2007-162077, though the use of the organic binders is suppressed, it is not always possible to mold the ceramic material having the complicated shape.

SUMMARY OF THE INVENTION

The primary object of the present invention is to provide a process for producing a ceramic material, wherein molding of a ceramic material having a complicated shape is enabled, and wherein use of an organic binder acting as an environmental load substance is suppressed.

Another object of the present invention is to provide an apparatus for carrying out the process for producing a ceramic material.

The present invention provides a first process for producing a ceramic material, comprising the steps of:

i) locating a mask, which has a predetermined shape, on a substrate, ii) forming a spacing between the substrate and the mask, which has the predetermined shape, iii) jetting out an aerosol, which contains a carrier gas and raw material particles dispersed in the carrier gas, onto the substrate, and iv) causing the jetted-out aerosol to flow into the spacing between the substrate and the mask, the raw material particles, which are contained in the aerosol, being deposited in the spacing between the substrate and the mask, whereby a molded body having the same shape as the shape of the mask is formed.

The term "mask" as used herein broadly means the mask which covers the entire area or a part of the surface of the substrate. The mask is not limited to a single mask and may be constituted of a plurality of masks. Also, the mask is not limited to a specific shape and embraces a mask having an aperture region, a comb-shaped mask, and the like.

The present invention also provides a second process for producing a ceramic material, comprising the steps of:

i) covering a substrate by a mask having an aperture region, ii) jetting out an aerosol, which contains a carrier gas and raw material particles dispersed in the carrier gas, via the mask toward the substrate, and iii) causing the jetted-out aerosol to flow from the aperture region of the mask into a spacing between the mask and a region of the substrate which region is covered by the mask, the raw material particles, which are contained in the aerosol, being deposited in the spacing on the region of the substrate which region is covered by the mask, whereby a molded body is formed.

The term "aperture region" as used herein means the aperture region of the mask which has the aperture-provided shape, an edge region of an outer periphery of the comb-shaped mask, or the like.

Each of the first and second processes for producing a ceramic material in accordance with the present invention may be modified such that the molded body is subjected to firing processing.

The present invention further provides an apparatus for producing a ceramic material, comprising:

i) a substrate, ii) a mask having an aperture region, which mask is located on the substrate, iii) aerosol forming means for forming an aerosol, which contains a carrier gas and raw material particles dispersed in the carrier gas, and iv) jetting-out means for jetting out the aerosol via the mask toward the substrate.

With each of the first and second processes for producing a ceramic material and the apparatus for producing a ceramic material in accordance with the present invention, the jetted-out aerosol is caused to flow into the spacing between the substrate and the mask, and the raw material particles, which are contained in the aerosol, are deposited in the spacing on the region of the substrate, at which region the mask is located. In this manner, the molded body is formed. Therefore, in cases where a mask having a complicated shape, which mask has been formed by etching processing, or the like, is used, the raw material particles are deposited on the substrate in accordance with the mask shape at the region to which the aerosol is jetted out. Accordingly, the molded body having a complicated shape is formed accurately.

Also, the raw material particles are deposited principally at the spacing and are adhered to one another to form a solid molded body. Therefore, the use of an organic binder acting as an environmental load substance is suppressed. In cases where the molded body is subjected to the firing processing, the raw material particles are sintered together, and therefore a sintered body having an enhanced mechanical strength is obtained.

BRIEF DESCRIPTION OF THE DRAWINGS

FIGS. 5A to 5F are explanatory views showing how a molded body is formed in the second embodiment of FIG. 4.

DESCRIPTION OF THE PREFERRED EMBODIMENTS

The present invention will hereinbelow be described in further detail with reference to the accompanying drawings.

Figure 1:
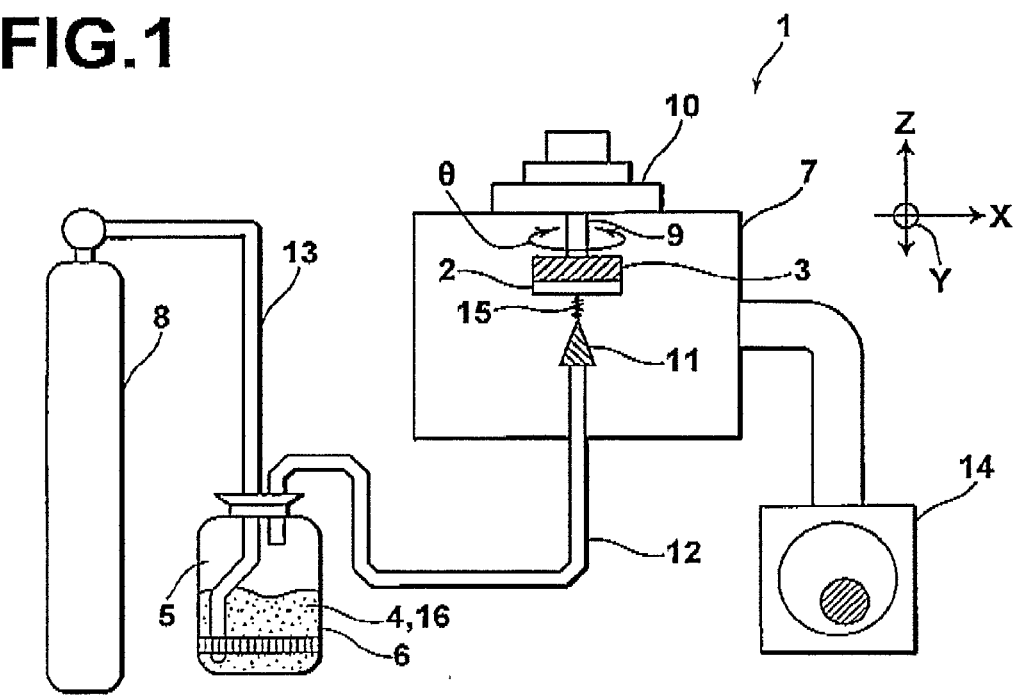
FIG. 1 is a schematic view showing a molding apparatus 1, which is a first embodiment of the molding apparatus in accordance with the present invention.

FIG. 1 is a schematic view showing a molding apparatus 1, which is a first embodiment of the molding apparatus in accordance with the present invention.

With reference to FIG. 1, the molding apparatus 1 comprises an aerosolizing chamber 6, in which raw material particles 4 and a carrier gas 5 are mixed together with stirring. The molding apparatus 1 also comprises a molding chamber 7, in which molding processing is performed. The molding apparatus 1 further comprises a high-pressure gas cylinder 8 for storing the carrier gas 5. The molding chamber 7 is provided with a substrate 3, on which the raw material particles 4 are to be deposited. The molding chamber 7 is also provided with a holder 9 for supporting the substrate 3. The molding chamber 7 is further provided with a stage 10 for moving the holder 9 in three-dimensional directions (X, Y, Z, and θ directions). The molding chamber 7 is still further provided with a nozzle 11 having a thin orifice, through which the raw material particles 4 are to be jetted out to the substrate 3. The molding apparatus 1 still further comprises a first pipe line 12 for connecting the nozzle 11 and the aerosolizing chamber 6 to each other. The molding apparatus 1 also comprises a second pipe line 13 for connecting the aerosolizing chamber 6 and the high-pressure gas cylinder 8 to each other. The molding apparatus 1 further comprises a vacuum pump 14 for evacuating the molding chamber 7. The molding apparatus 1 still further comprises a mask 2 for covering the substrate 3.

In cases where the molding processing is to be performed by use of the molding apparatus 1, the carrier gas 5 is introduced from the high-pressure gas cylinder 8, which stores the carrier gas 5, through the second pipe line 13 into the aerosolizing chamber 6, and the raw material particles 4 having been filled in the aerosolizing chamber 6 are vibrated and stirred together with the carrier gas 5. In the aerosolizing chamber 6, the raw material particles 4 are thus dispersed in the carrier gas 5, and an aerosol 15 is formed.

The mask 2 is located on the substrate 3. A periphery of the mask 2 or a part of the mask 2 other than the region of the mask 2, which region corresponds to the shape to be molded, is secured to the substrate 3. In cases where the mask 2 is secured to the substrate 3, the mask 2 may be secured to the substrate 3 by an adhesive agent. Alternatively, the mask 2 may be pushed and secured to the substrate 3 by use of a fixture. At this time, the securing is performed such that the region of the mask 2, which region corresponds to the shape to be molded, is not secured to the substrate 3 by the adhesive agent, or the like.

The raw material particles 4 contained in the aerosol 15 pass through the first pipe line 12 and are jetted out from the thin orifice of the nozzle 11, which is located in the molding chamber 7, via the mask 2 to the substrate 3. When the raw material particles 4 contained in the aerosol 15 pass through the nozzle 11 having the fine orifice of at most 6 mm$^2$, the flow rate of the raw material particles 4 is easily increased to a value falling within the range of 2 m/sec to 400 m/sec.

As a result, the raw material particles 4 are deposited at the spacing between the substrate 3 and the mask 2. The step of jetting out the aerosol 15 via the mask 2 to the substrate 3 will be described later.

The molding chamber 7 is evacuated by the vacuum pump 14, and the degree of vacuum in the molding chamber 7 is adjusted when necessary. As described above, the holder 9 for supporting the substrate 3 is capable of being moved by the stage 10 in the three-dimensional directions. Therefore, the raw material particles 4 are deposited to a predetermined thickness at the predetermined region of the substrate 3. Specifically, in case where the movement speed of the substrate 3 relative to the nozzle 11 is controlled by the stage 10, it is possible to control the thickness of the deposited layer of the raw material particles 4 during one time of reciprocating movement of the nozzle 11.

After the raw material particles 4 have been deposited to a predetermined thickness, the mask 2 is removed from the substrate 3.

A molded body 17 having been formed on the substrate 3 as will be described later is put in an electric furnace (not shown). In the electric furnace, the molded body 17 is heated at a predetermined temperature rising rate, is kept at a predetermined temperature for a predetermined period of time, and is then cooled. The molded body 17 is thus subjected to the firing processing. In cases where the adhesion of the raw material particles 4 to one another is strong or in cases where the raw material particles 4 do not contain an organic binder 16, the firing processing described above need not necessarily be performed.

By the firing processing, the molded body 17 is sintered, contracted, and separated as the sintered body from the substrate 3. The sintered body having been separated from the substrate 3 is obtained with the same shape as the shape of the region of the mask 2, to which the aerosol 15 has been jetted out from the nozzle 11.

Figure 2:
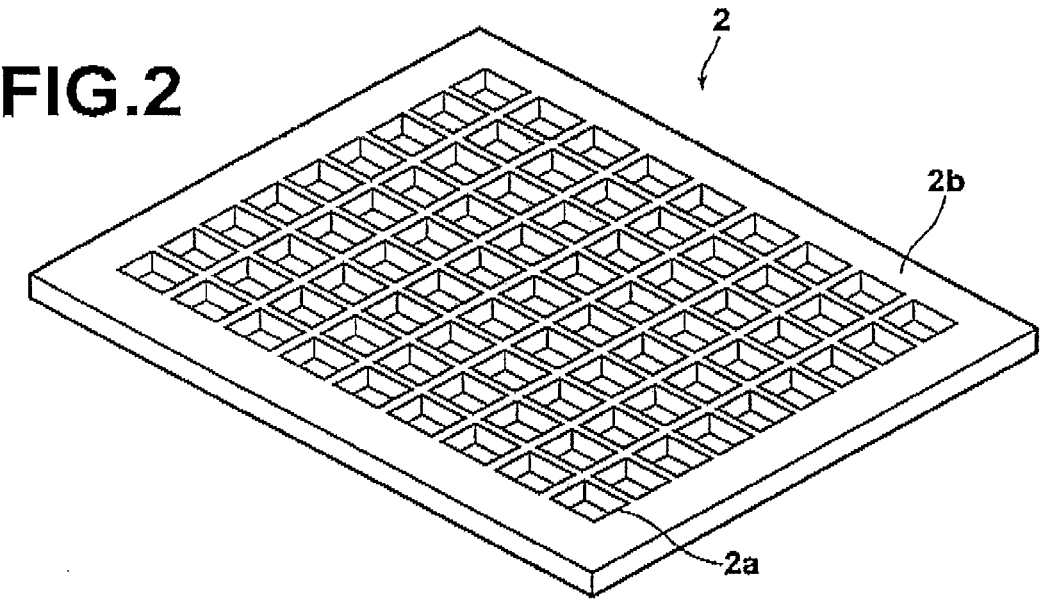
FIG. 2 is a perspective view showing a mask 2 employed in the first embodiment of FIG. 1, FIGS. 3A, 3B, 3C, and 3D are explanatory views showing how a molded body is formed in the first embodiment of FIG. 1.

FIG. 2 is a perspective view showing a mask 2 employed in the first embodiment of FIG. 1. As illustrated in FIG. 2, the mask 2 comprises aperture regions 2a, 2a, . . . and a securing region 2b, which is utilized for the securing to the substrate 3. In the first embodiment, the single mask 2 is employed, and the mask 2 has the aperture-provided shape. However, the molding apparatus is not limited to the embodiment described above. For example, as described above, the mask may be constituted of a plurality of masks. Also, the mask shape is not limited to the aperture-provided shape and may be a comb-like shape, or the like. Also, with the first embodiment, the peripheral region of the mask 2 is utilized as the securing section 2b, and therefore dense molding is capable of being performed. The mask 2 may be a metal mask. However, the mask 2 should preferably be a polyimide mask. In such cases, denser molded bodies are capable of being molded. Specifically, in the cases of the metal mask, such as a stainless steel mask, the thickness of the mask should preferably be approximately 1 mm. In the cases of the polyimide mask, the thickness of the mask should preferably be approximately 130 µm.

Reverting to FIG. 1, in this embodiment, as the substrate 3, a zirconia substrate having a high heat resistance is employed. The substrate size may fall within the range of a 5 mm-square size to a 50 mm-square size and should preferably be a 25 mm-square size. At the time of the deposition of the raw material particles 4, the temperature of the substrate 3 may be the room temperature and should preferably be adjusted at a predetermined temperature such that denser molded body may be formed.

As the raw material particles 4, particles of lead zirconate titanate (PZT) are employed. The particles should preferably have a mean particle diameter falling within the range of approximately 0.1 µm to 3 µm. Also, the particles should preferably be such that the proportion of the particles having the particle diameter falling within the range of 0.1 µm to 2 µm is equal to at least 50% by weight. The term "particle diameter" as used herein means the equivalent sphere diameter, which is the diameter of a sphere having the same volume as the volume of the particle. Also, the term "mean particle diameter" as used herein means the number-average particle diameter. The raw material particles 4 may be granulated particles containing the organic binder 16. Such that the formation of the aerosol 15 may be enabled, it is necessary for the granulated particles to have a mean particle diameter falling within the range described above. The organic binder 16 may be a polyvinyl alcohol, methyl cellulose, or an acrylic resin.

As the carrier gas 5, it is possible to use a helium (He) gas, an oxygen ($O_2$) gas, a nitrogen ($N_2$) gas, an argon (Ar) gas, a mixed gas containing two or more of the above-enumerated gases, dry air, or the like.

FIGS. 3A, 3B, 3C, and 3D are explanatory views showing how a molded body is formed in the first embodiment of FIG. 1. In FIGS. 3A, 3B, 3C, and 3D, for clearness, members other than the cross-sections of the mask 2 and the substrate 3 are omitted.

Figure 3A:
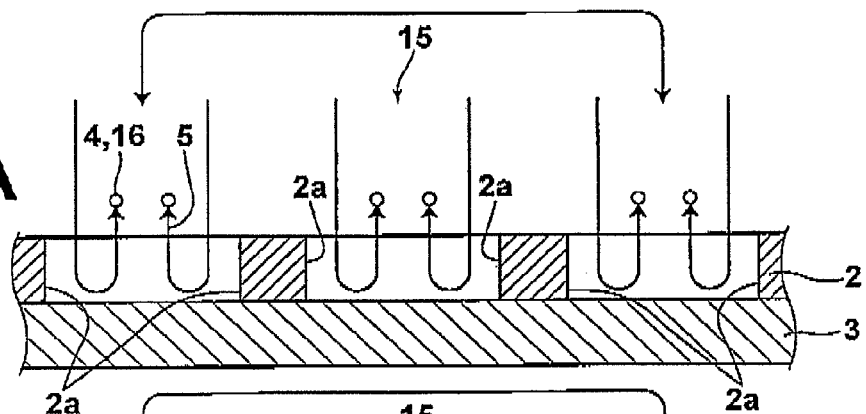

As illustrated in FIG. 3A, the aerosol 15 having been jetted out from the nozzle 11 passes through each of aperture regions 2a, 2a, . . . of the mask 2 and impinges upon the substrate 3. The aerosol flows as a turbulent flow within each aperture region 2a, and the raw material particles 4 are discharged by the turbulent flow from the aperture region 2a.

Figure 3B:
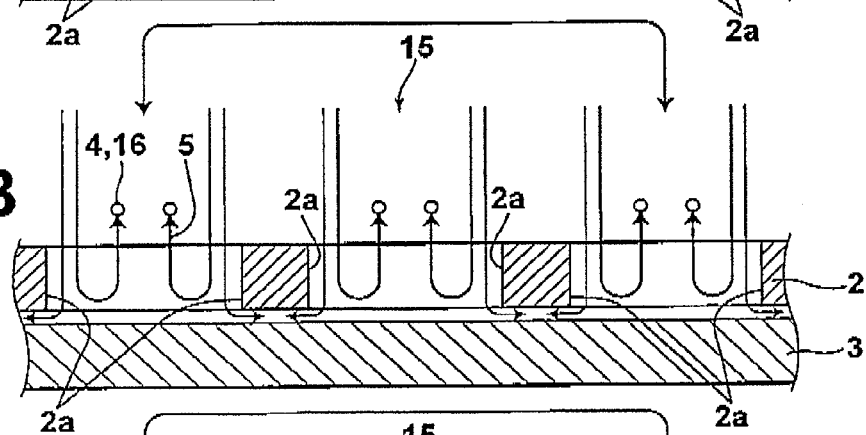

As illustrated in FIG. 3B, a part of the aerosol 15 flowing as the turbulent flow within the aperture region 2a is discharged from the aperture region 2a, and a part of the aerosol 15 flows into the region between the mask 2 and the substrate 3. Specifically, the mask 2 is bent, and a spacing is formed between the mask 2 and the substrate 3.

Figure 3C:
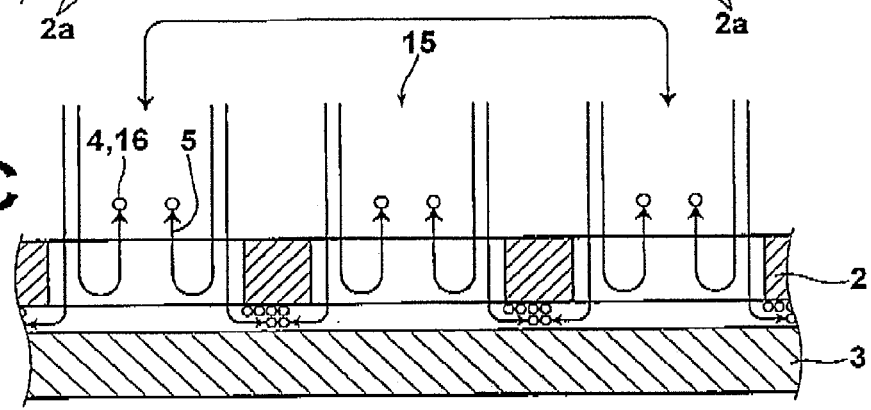

At this stage, as illustrated in FIG. 3C, the raw material particles 4 enter into the spacing, which has been formed between the mask 2 and the substrate 3 by the flowing of the aerosol 15. Since the raw material particles 4 enter into the spacing, the raw material particles 4 collide with one another and adhere together by the shock. The raw material particles 4 having an increased weight due to the adhesion are pushed in the spacing against the substrate 3 and are deposited in the spacing on the substrate 3.

Figure 3D:
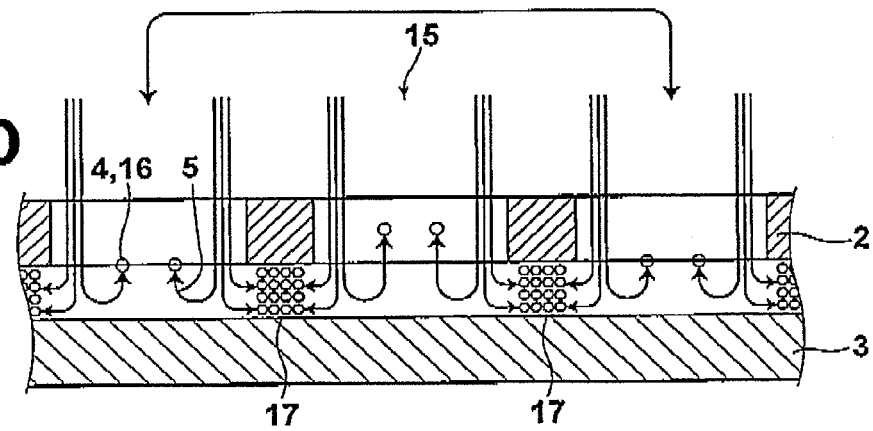

As illustrated in FIG. 3D, the jetting out of the aerosol 15 is continued, and the aerosol 15 enters into the spacing even further. As a result, the raw material particles 4 collide with one another and are deposited even further in the spacing on the substrate 3. In this manner, the molded body 17 is formed. In cases where the molded body 17 is subjected to the firing processing in an electric furnace (not shown), the raw material particles 4 are sintered together, and the mechanical strength of the molded body 17 is enhanced.

A second embodiment of the molding apparatus in accordance with the present invention will be described hereinbelow.

Figure 4:
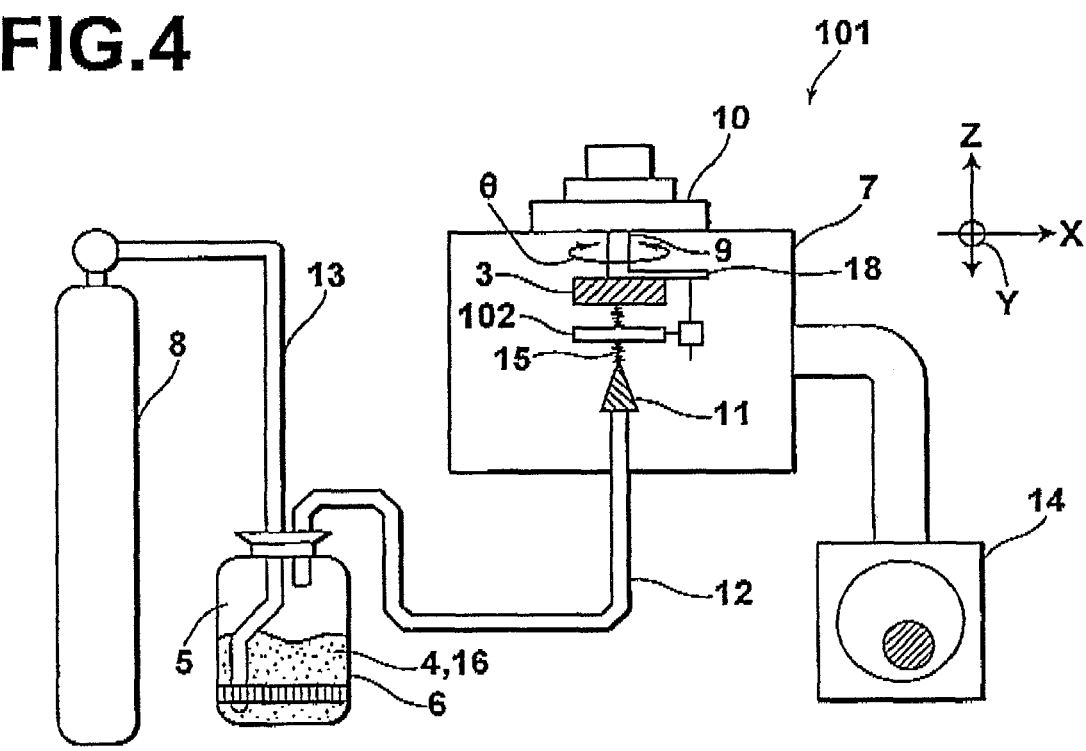
FIG. 4 is a schematic view showing a molding apparatus 101, which is a second embodiment of the molding apparatus in accordance with the present invention.
Figure 6:
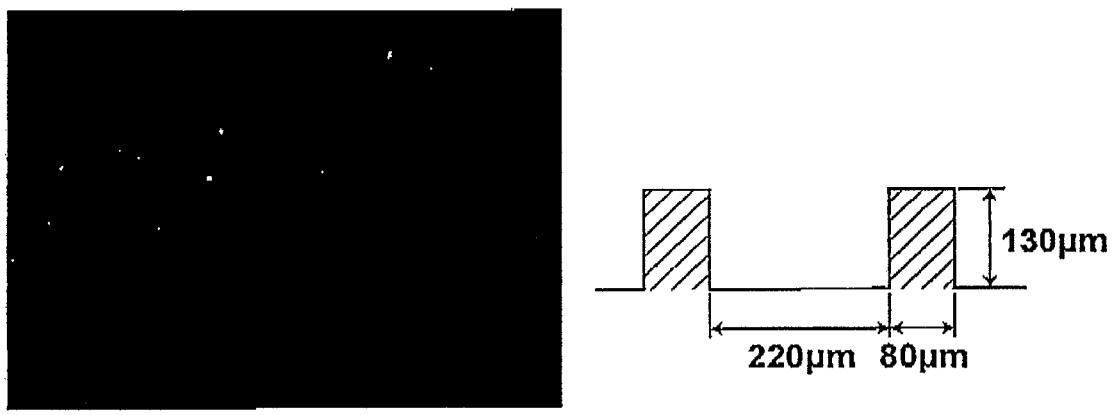
FIG. 6 is an explanatory view showing a polyimide mask employed in Example in accordance with the present invention and a sectional shape of the mask.
Figure 7:
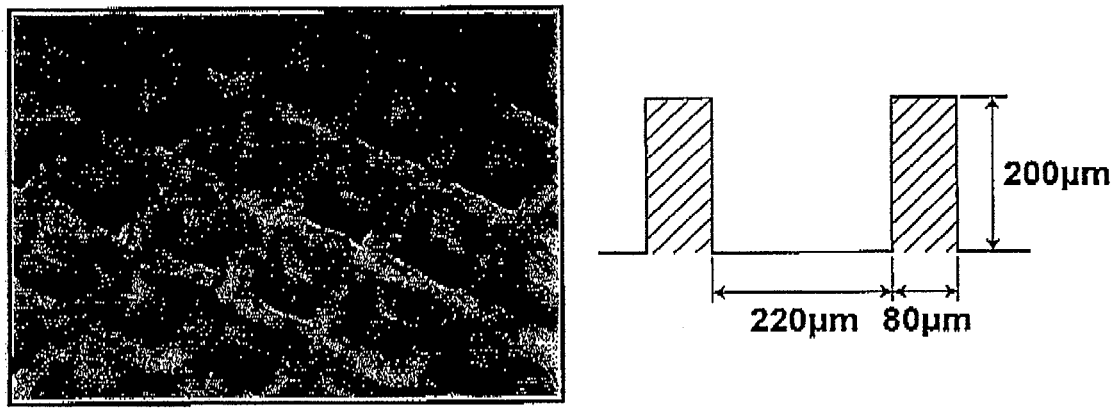
FIG. 7 is an explanatory view showing a PZT molded body having been molded in Example in accordance with the present invention and a sectional shape of the PZT molded body.

FIG. 4 is a schematic view showing a molding apparatus 101, which is a second embodiment of the molding apparatus in accordance with the present invention. The second embodiment of the molding apparatus 101 is constituted basically in the same manner as that in the first embodiment of the molding apparatus 1 of FIG. 1, except that spacing forming means 18 for forming a spacing between the substrate 3 and a mask 102 is provided on the holder 9, and except that the mask 102 is capable of being moved with respect to the substrate 3 (in the direction indicated by the arrow Z in FIG. 4). For facilitating the explanation, in FIG. 4, similar elements are numbered with the same reference numerals with respect to FIG. 1.

FIGS. 5A to 5F are explanatory views showing how a molded body is formed in the second embodiment of FIG. 4. In FIGS. 5A to 5F, for clearness, members other than the mask 102, the substrate 3, and the nozzle 11 are omitted. Also, the mask 102 is secured to the spacing forming means 18 (not shown in FIGS. 5A to 5F).

As illustrated in FIG. 5A, the mask 102 employed in the second embodiment is a comb-shaped mask which does not have the aperture-provided shape. However, as in the first embodiment, the mask shape is not limited to the comb-like shape and may be the aperture-provided shape.

As illustrated in FIG. 5B, the aerosol 15 is jetted out from the nozzle 11 via the mask 102 to the substrate 3.

As illustrated in FIG. 5C, the mask 102 is moved by the spacing forming means 18 (not shown in FIGS. 5A to 5F) in the direction indicated by the arrow Z, and the spacing is formed between the mask 102 and the region of the substrate 3, at which region the mask 102 is located. The raw material particles 4 are deposited in the spacing on the substrate 3. Specifically, the movement speed of the mask 102 in the direction indicated by the arrow Z should preferably be equal to approximately 100 μm/min. The effects of the aerosol 15 having been jetted out are the same as those in the first embodiment described above.

As illustrated in FIG. 5D, the nozzle 11 is moved by the stage 10 with respect to the substrate 3 in the direction indicated by the arrow Y. In this manner, the raw material particles 4 are deposited in the predetermined region on the substrate 3, and the molded body 17 is formed.

As illustrated in FIG. 5E, at the time at which the thickness of the molded body 17 has reached a predetermined value, the jetting out of the aerosol 15 from the nozzle 11 is ceased.

As illustrated in FIG. 5F, the mask 102 is then removed from the substrate 3. In cases where the molded body 17 is subjected to the firing processing in an electric furnace (not shown), the raw material particles 4 are sintered together, and the mechanical strength of the molded body 17 is enhanced.

The present invention will further be illustrated by the following non-limitative example.

Example 1

A lattice-shaped polyimide mask having a plurality of aperture regions arrayed in a two-dimensional periodic pattern was prepared. Peripheral regions of the polyimide mask were secured by an adhesive agent to an yttrium stabilized zirconia (YSZ) substrate. Each of the aperture regions had a 220 μm-square size, and the periodic intervals of the aperture regions were 300 μm (lattice width: 80 μm). The thickness of the polyimide mask was 130 μm.

Thereafter, PZT (lead zirconate titanate) particles having a mean particle diameter of 0.3 μm were mixed with an $O_2$ gas and were thus aerosolized. The obtained aerosol was jetted out from a nozzle via the polyimide mask to the YSZ substrate. The nozzle was moved with respect to the YSZ substrate, and the aerosol was jetted to a predetermined area. The temperature of the YSZ substrate was the room temperature.

The PZT particles were deposited in the spacing between the polyimide mask and the YSZ substrate, and the height of the polyimide mask rose by 200 μm. At this time, the jetting out of the aerosol from the nozzle was ceased, and the polyimide mask was then removed. It was confirmed that a molded body, which had the lattice width of 80 μm and had a plurality of 220 μm-square aperture regions arrayed at periodical intervals, was formed. FIG. 6 is an explanatory view showing a polyimide mask employed in Example 1 in accordance with the present invention and a sectional shape of the mask. FIG. 7 is an explanatory view showing a PZT molded body having been molded in Example 1 in accordance with the present invention and a sectional shape of the PZT molded body.

The molded body having thus been obtained was fired at a temperature of 1,100° C. for three hours in an air atmosphere. By the sintering and the contraction due to the firing processing, the PZT sintered body separated from the YSZ substrate.

Therefore, in cases where the jetted-out aerosol was caused to flow from the aperture region of the polyimide mask into the spacing between the polyimide mask and the region of the YSZ substrate which region was covered by the polyimide mask, the PZT particles, which were contained in the aerosol, were deposited in the spacing on the region of the YSZ substrate which region was covered by the polyimide mask. Therefore, in cases where a mask having a complicated shape was used, the PZT particles were deposited on the YSZ substrate in accordance with the mask shape at the region to which the aerosol was jetted out. Also, the PZT particles were deposited principally at the spacing and were adhered to one another. Therefore, the use of an organic binder was suppressed.

What is claimed is:

1. A process for producing a ceramic material, comprising the steps of:

i) locating a mask, which has a predetermined shape, on a substrate, ii) forming a spacing between the substrate and the mask, which has the predetermined shape, iii) jetting out an aerosol, which contains a carrier gas and raw material particles dispersed in the carrier gas, onto the substrate, and iv) causing the jetted-out aerosol to flow into the spacing between the substrate and the mask, the raw material particles, which are contained in the aerosol, being deposited in the spacing between the substrate and the mask, whereby a molded body having the same shape as the shape of the mask is formed, wherein the mask includes aperture portions and non-aperture portions, wherein when the jetted-out aerosol flows into the spacing between the substrate and the mask, the raw material particles of the aerosol deposit under the non-aperture portions to provide the molded body in the same shape as the mask.

2. A process for producing a ceramic material as defined in claim 1 wherein the molded body is subjected to firing processing.

3. The process according to claim 1, wherein the raw material particles of the jetted out aerosol flows out of the aperture portions in the mask to leave voids in areas corresponding to the aperture portions of the mask.

4. A process for producing a ceramic material, comprising the steps of:

i) covering a substrate by a mask having an aperture region, ii) jetting out an aerosol, which contains a carrier gas and raw material particles dispersed in the carrier gas, via the mask toward the substrate, and iii) causing the jetted-out aerosol to flow from the aperture region of the mask into a spacing between the mask and a region of the substrate which region is covered by the mask, the raw material particles, which are contained in the aerosol, being deposited in the spacing on the region of the substrate which region is covered by the mask, whereby a molded body is formed, wherein the mask includes aperture portions and non-aperture portions, wherein when the jetted-out aerosol flows into the spacing between the substrate and the mask, the raw material particles of the aerosol deposit under the non-aperture portions to provide the molded body in the same shape as the mask.

5. A process for producing a ceramic material as defined in claim 4 wherein the molded body is subjected to firing processing.

6. The process according to claim 2, wherein the raw material particles of the jetted out aerosol flows out of the aperture portions in the mask to leave voids in areas corresponding to the aperture portions of the mask.

* * * * *